US010231014B2

United States Patent
Ye et al.

(10) Patent No.: US 10,231,014 B2
(45) Date of Patent: Mar. 12, 2019

(54) VIRTUAL REALITY (VR) VIDEO DISTRIBUTION USING EDGE RESOURCES

(71) Applicant: Futurewei Technologies, Inc., Plano, TX (US)

(72) Inventors: Yinghua Ye, Santa Clara, CA (US); Hang Shi, Santa Clara, CA (US); Huida Dai, Santa Clara, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/458,485

(22) Filed: Mar. 14, 2017

(65) Prior Publication Data

US 2018/0270531 A1    Sep. 20, 2018

(51) Int. Cl.
| | |
|---|---|
| G09G 5/00 | (2006.01) |
| H04N 21/442 | (2011.01) |
| H04W 28/02 | (2009.01) |
| H04L 12/26 | (2006.01) |
| H04L 29/06 | (2006.01) |
| H04N 21/61 | (2011.01) |
| H04N 21/81 | (2011.01) |
| H04W 88/02 | (2009.01) |

(52) U.S. Cl.
CPC ....... *H04N 21/44218* (2013.01); *H04L 43/16* (2013.01); *H04L 67/38* (2013.01); *H04N 21/44209* (2013.01); *H04N 21/6131* (2013.01); *H04N 21/816* (2013.01); *H04W 28/0268* (2013.01); *H04W 88/02* (2013.01)

(58) Field of Classification Search
CPC ..... H04W 4/38; H04W 72/042; H04W 88/08; H04W 48/02; H04W 8/00
See application file for complete search history.

(56) References Cited

U.S. PATENT DOCUMENTS

| | | | |
|---|---|---|---|
| 2017/0064616 A1* | 3/2017 | Park | H04W 4/50 |
| 2018/0077451 A1* | 3/2018 | Yip | H04N 21/44008 |

OTHER PUBLICATIONS

Qian, Feng, et al., "Optimizing 360 Video Delivery Over Cellular Networks", Proceedings of the 5th Workshop on All Things Cellular: Operations, Applications and Challenges (ATC '16), (2016), 6 pgs.

* cited by examiner

*Primary Examiner* — Weiming He
(74) *Attorney, Agent, or Firm* — Schwegman Lundberg & Woessner, P.A.

(57) ABSTRACT

A method includes an edge resource receiving virtual reality (VR) content responsive to a VR session request of a user equipment (UE), the edge resource receiving a wireless link condition indication and a field of view (FOV) information from the UE, with the wireless link condition indication corresponding to a wireless link, and the edge resource adapting the VR content according to the FOV information and the wireless link condition indication.

20 Claims, 5 Drawing Sheets

VIRTUAL REALITY (VR) VIDEO DISTRIBUTION USING EDGE RESOURCES

TECHNICAL FIELD

The present disclosure is related to video distribution, and in particular to virtual reality (VR) video distribution using edge resources of a communications network.

BACKGROUND

Virtual reality videos may include 360 degree view videos that provide users with a panoramic view. Virtual reality systems allow users to freely control their viewing direction during video play-back. Such 360 degree video players compute and display the viewing area based on the orientation of a display and user, and the field of view (FOV) that a user is likely able to see.

Current 360 degree video delivery techniques largely inherit the delivery scheme from traditional video, resulting in the video player fetching an entire 360 degree video content including visible and not visible portions of the content. This leads to huge resource wastage, as there is no need for the content that is not viewable. In a mobile network, where wireless resources are very scarce, such wastage may be costly in terms of wasted network bandwidth, as well as cost to the user of retrieving more data than needed for good quality of viewing experience.

SUMMARY

According to one aspect of the present disclosure, there is provided a method that comprises: an edge resource receiving virtual reality (VR) content responsive to a VR session request of a user equipment (UE); the edge resource receiving a wireless link condition indication and a field of view (FOV) information from the UE, with the wireless link condition indication corresponding to a wireless link; and the edge resource adapting the VR content according to the FOV information and the wireless link condition indication.

Optionally, in any of the preceding aspects, adapting the VR content comprises: dividing the VR content into multiple VR content cells covering multiple portions of the FOV; and selecting one or more VR content cells of the multiple VR content cells as the adapted VR content.

Optionally, in any of the preceding aspects, the multiple VR content cells comprise multiple exclusive VR content cells covering multiple exclusive portions of the FOV or multiple non-exclusive VR content cells covering multiple non-exclusive portions of the FOV.

Optionally, in any of the preceding aspects, the method further includes the edge resource obtaining a user movement prediction and adapting the VR content according to the FOV information, the wireless link condition indication, and the user head movement prediction.

Optionally, in any of the preceding aspects, the FOV information includes a predicted FOV, and with selecting the one or more VR content cells comprising selecting the one or more VR content cells based at least in part on the predicted FOV.

Optionally, in any of the preceding aspects, the FOV information includes a predicted FOV, and adapting the VR content comprises adapting the VR content according to the FOV information, the wireless link condition information, and the predicted FOV.

Optionally, in any of the preceding aspects, adapting the VR content comprises changing a VR content resolution of the adapted VR content.

Optionally, in any of the preceding aspects, the VR content is adapted if the wireless link condition indication does not exceed a satisfactory wireless link condition threshold.

Optionally, in any of the preceding aspects, the VR content is adapted if the wireless link condition indication does not exceed a satisfactory wireless link condition threshold and the VR content is not adapted if the wireless link condition indication exceeds the satisfactory wireless link condition threshold.

According to one aspect of the present disclosure, there is provided an edge resource that comprises: a memory storage comprising instructions; and one or more processors in communication with the memory, wherein the one or more processors execute the instructions to: receive virtual reality (VR) content responsive to a VR session request of a user equipment (UE); receive a wireless link condition indication and a field of view (FOV) information from the UE, with the wireless link condition indication corresponding to a wireless link; and adapt the VR content according to the FOV information and the wireless link condition indication.

Optionally, in any of the preceding aspects, adapting the VR content comprises: dividing the VR content into multiple VR content cells covering multiple portions of the FOV; and selecting one or more VR content cells of the multiple VR content cells as the adapted VR content.

Optionally, in any of the preceding aspects, the multiple VR content cells comprise multiple exclusive VR content cells covering multiple exclusive portions of the FOV or multiple non-exclusive VR content cells covering multiple non-exclusive portions of the FOV.

Optionally, in any of the preceding aspects, the edge resource further performs: obtaining a user movement prediction and adapting the VR content according to the FOV information, the wireless link condition indication, and the user movement prediction.

Optionally, in any of the preceding aspects, the FOV information includes a predicted FOV, and selecting the one or more VR content cells comprises selecting the one or more VR content cells based at least in part on the predicted FOV.

Optionally, in any of the preceding aspects, the FOV information includes a predicted FOV, and adapting the VR content comprises adapting the VR content according to the FOV information, the wireless link condition information, and the predicted FOV.

Optionally, in any of the preceding aspects, adapting the VR content comprises changing a VR content resolution of the adapted VR content.

Optionally, in any of the preceding aspects, the VR content is adapted if the wireless link condition indication does not exceed a satisfactory wireless link condition threshold.

Optionally, in any of the preceding aspects, the VR content is adapted if the wireless link condition indication does not exceed a satisfactory wireless link condition threshold and the VR content is not adapted if the wireless link condition indication exceeds the satisfactory wireless link condition threshold.

According to one aspect of the present disclosure, there is provided a non-transitory machine-readable medium that stores instructions which, when executed by one or more processors of an edge resource, cause the edge resource to: receive virtual reality (VR) content responsive to a VR session request of a user equipment (UE); receive a wireless link condition indication and a field of view (FOV) information from the UE, with the wireless link condition indication corresponding to a wireless link; and adapt the VR content according to the FOV information and the wireless link condition indication.

Optionally, in any of the preceding aspects, adapting the VR content comprises: dividing the VR content into multiple VR content cells covering multiple portions of the FOV; and selecting one or more VR content cells of the multiple VR content cells as the adapted VR content.

Any one of the foregoing examples may be combined with any one or more of the other foregoing examples to create a new embodiment within the scope of the present disclosure.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

One existing proposed cellular bandwidth friendly 360 degree video delivery scheme is based on head movement prediction. Instead of downloading an entire 360 degrees of video content, the player may just fetch the parts corresponding to content that is visible to the user via a display, such as a head mounted display (HMD). Thus the bandwidth utilized can be reduced without degrading the user experience compared with retrieving full video content. However, as the number of user equipment (UE) watching the same content increases, and each UE has to fetch contents from the source, multiple copies of different or same contents of the same video sources are transmitted. The transmission of multiple copies diminishes the benefits of the bandwidth reduction, and even worse, the bandwidth demands can increase if the number of UEs watching the same video source reaches certain number. Another problem is that reporting the results of UE's head movement prediction to the content server may take a long time, which leads to a poor quality of user experience. Existing approaches do not take network condition into account.

Virtual reality (VR) applications which include 360 degree video work best with low latency and high throughput. VR should be delivered to human eyes in about 20 milliseconds (ms) for good quality of experience (QoE). Considering the rendering time occurring at a client and mobile VR processing time occurring at a source, delivering mobile VR within 20 ms becomes challenging for mobile networks.

The conditions of a wireless link are aspects of the wireless link that affect bandwidth or latency of communications using the wireless link. The wireless link may become a bottleneck of network performance due to the wireless link conditions. Streaming high definition VR under bad link conditions causes congestions, leads to packet losses and excessive packet retransmission, and finally results in unbearable Quality of Experience (QoE).

Figure 1:
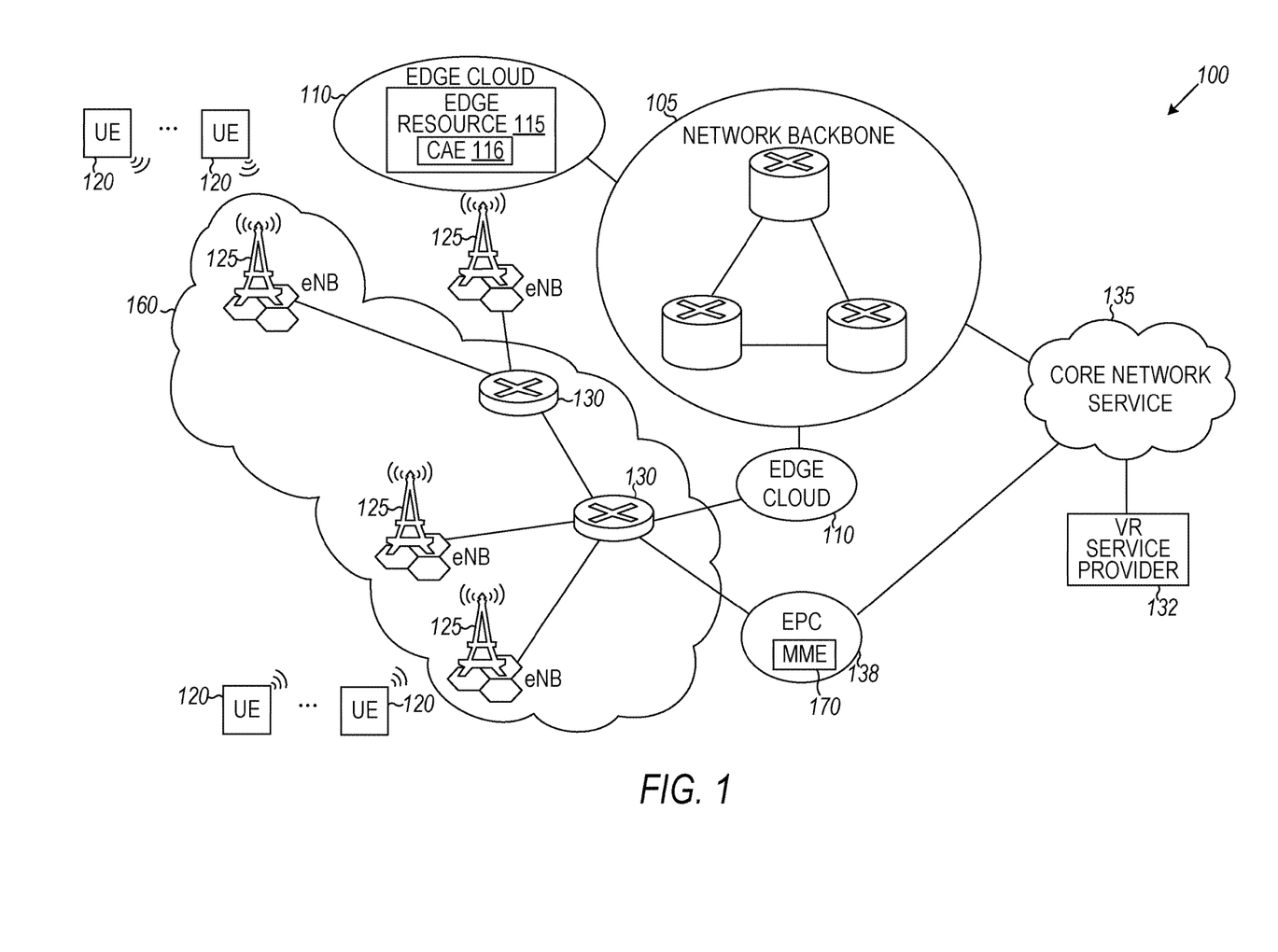
FIG. 1 is a block diagram of a hierarchical virtual reality (VR) services distribution system according to an example embodiment.

FIG. 1 is a block diagram of a hierarchical VR services distribution system 100 according to an example embodiment. Shown in the hierarchical VR services distribution system 100 is a network backbone 105, edge clouds 110, an edge resource 115, a content adaptation engine (CAE) 116, UEs 120, base stations 125, routers 130, a VR service provider 132, a core network service 135, evolved packet core (EPC) 138, a radio access network (RAN) 160, and a mobility management entity (MME) 170.

The VR services distribution system 100 performs VR video distribution using edge resources at or near an edge of the network. Latency-sensitive VR services may be distributed via a network backbone 105 to one or more edge clouds 110. An edge cloud 110 can include processors and memories, with one or more processors together with one or more memories forming an edge resource 115 within the edge cloud 110. An edge cloud 110 can include multiple such edge resources 115. The edge resources 115 of the edge clouds 110 can interact with one or more UEs 120 using the VR services distribution system 100, including using a RAN 160. The RAN 160 may include multiple base stations 125, such as evolved node Bs (eNBs), for example. The base stations 125 communicate wirelessly (directly) with the UEs 120, and may also include one or more routers 130 that communicate with each other and also with the base stations 125.

The RAN 160 provides a low latency path between the network edge resources 115 and the UEs 120. A VR session (or VR data) may originate with a VR service provider 132 that may be coupled directly or indirectly to core network services 135. The VR service provider 132 may communicate with the routers 130 via an EPC 138 in some examples. The VR service provider 132 may be a VR service provider storing and serving VR content to multiple users. The VR service provider 132 may be a VR server in some examples.

The VR services distribution system 100 performs VR content adaptation, where content adaptation is that action of transforming content to adapt to device capabilities (i.e., capabilities of the device or devices receiving the content). Content adaptation is usually related to mobile devices that require special processing as part of downloading data because of limited computational power, small screen or display size, and constrained input functionality. In some embodiments, the VR content adaptation is performed by a CAE 116 of an edge resource 115 of an edge cloud 110.

System 100 may achieve low latency and high throughput requirements for mobile VR users (UEs 120). Low latency and high throughput may be achieved in some examples by moving at least some of the processing to the edge resources 115 from the network backbone 105, including the edge resources 115 having low latency connections to UEs 120. Low latency and high throughput may be achieved in some examples by adapting the VR content being provided to UEs. In an example embodiment, the edge resource receives VR content responsive to a VR session request from a UE, receives a wireless link condition indication and field of view (FOV) information from the UE, with the wireless link condition indication corresponding to a wireless link, and adapts the VR content according to the FOV information and the wireless link condition indication. Further improvements in latency and throughput can include employing FOV prediction to adapt the content to reduce the amount of content delivered to the UEs 120 via the RAN 160. Further embodiments adapt the content to control bandwidth used based on the condition of the wireless link to the UE. The reduction of VR content to be transported over the RAN 160 is also achieved by having the VR content sent from the VR service provider 132 to the edge resources 115, wherein multiple UEs 120 receive the VR content that fits its FOV and the wireless link condition. The UEs 120 receive the VR content directly from the edge resource, instead of each UE individually obtaining VR content from the VR service provider 132. This reduces network congestion and saves bandwidth in the transport network.

Edge resources 115 can reduce latency, such as in the RAN 160, for example. The edge resources 115 perform video rendering services, as well as content adaptation. The edge resources 115 can perform content adaption according to a wireless link condition indication and a FOV information received from the UE 120, in some embodiments. The edge resources 115 can perform content adaption according to a wireless link condition indication, and a FOV information received from the UE 120, along with a FOV prediction in some embodiments. The VR service provider 132 may continue to provide services that are not latency sensitive via the EPC 138. Such non latency sensitive services may include account management, selection of content, and other services. An edge resource 115 may service multiple UEs 120, and multiple edge resources 115 may be used to service UEs 120 in different wireless coverage areas. This allows a VR server, such as the VR service provider 132, to provide content to one or more edge resources 115, which then handle the distribution directly to UEs 120. The one or more edge resources 115 further receive FOV information from UEs 120 and render the corresponding VR video for the UEs 120 using a CAE 116.

The UE 120 sends a VR session request to the EPC 138. The MME 170 and/or other core network control components will decide where the request should be serviced, based on VR latency and throughput requirements, for example. The MME 170 (or other core network elements) redirects the request to one or more of the edge resources 115. If an edge resource 115 has already served such a request to other UEs 120, the edge resource 115 performs content adaptation based on UE requirements. If the edge resource 115 doesn't have the corresponding VR content, the edge resource 115 sends the request to the VR service provider 132 through alternative networks (such as the network backbone 105, for example). The MME 170 (and other core network control components) instructs the routers 130 (or any other or additional network components) to set up a connection between the particular UE 120 and the selected edge cloud 110 (e.g., the edge cloud 110 associated with the edge resource 115 to which the request is redirected).

If the UE 120 is attached to a base station 125 that has a backhaul connection to the edge cloud 110, the MME 170 will create sessions between the base station 125 and user plane components inside the edge cloud 110, and the user plane components will send traffic to VR services hosted in the edge cloud 110. If the content is not found in VR services, VR services will request contents from original server. This is similar to what current a content delivery network (CDN) does.

If a UE is attached to a base station which has no backhaul connection to edge cloud, an X2 interface (as defined in Technical Specification ETSI TS 136 420) can be used for sending traffic to another base station which has a backhaul connection to the edge cloud.

The edge resource 115 receives the VR content from the VR service provider 132. The edge resource 115 in some examples receives the VR content from the VR service provider 132 via the edge cloud 110. The edge resource 115 in some examples receives the VR content from the VR service provider 132 via the edge cloud 110 and the network backbone 105.

The edge resource 115 can receive a VR session request from the UE via a wireless link between the UE 120 and the RAN 160. The edge resource 115 can receive a VR session request from the UE via a wireless link between the UE 120 and the base station 125 of the RAN 160.

The adaptation of the VR content can include changing a VR content resolution of the adapted VR content. The adaptation can include changing a VR content download rate.

The adaptation can include dividing the VR content into multiple VR content cells covering multiple portions of the FOV, and selecting one or more VR content cells of the multiple VR content cells as the adapted VR content. Here, the adaptation determines what portions of the VR content are not within the FOV and restricts the VR content to only the VR content within the FOV (or restricts the VR content to include both VR content within the FOV and some VR content only slightly out of the FOV). As a result, the adapted VR content does not necessarily include 360 degree view content. The multiple VR content cells in some embodiments comprise multiple exclusive VR content cells covering multiple exclusive portions of the FOV. Alternatively, in some embodiments the multiple VR content cells comprise multiple non-exclusive VR content cells covering multiple non-exclusive portions of the FOV.

In some embodiments, the edge resource obtains a user movement prediction and adapts the VR content according to the FOV information, the wireless link condition indication, and the user movement prediction. The FOV information includes a predicted FOV, with selecting one or more VR content cells as part of the adapting comprises selecting one or more VR content cells based at least in part on the predicted FOV. It should be understood that this listing is not exhaustive, and other adaptations are contemplated and are within the scope of the discussion and claims.

The VR content is adapted if the wireless link condition indication does not exceed a satisfactory wireless link condition threshold. The satisfactory wireless link condition threshold can comprise a predetermined threshold value chosen according to one or more of the characteristics of the particular UE 120, the characteristics of the VR content, or the characteristics of the RAN 160. If the wireless link condition indication does not exceed the satisfactory wireless link condition threshold, then providing non-adapted VR content to the requesting UE will likely result in a poor display of the VR content, or in difficulty or failure in transferring the entire non-adapted VR content to the requesting UE.

The edge resource 115 receives a wireless link condition indication from the UE requesting or receiving the VR content. The wireless link condition indication in some examples includes one or both of an available bandwidth at the UE 120 or a latency characteristic of the wireless link. In addition, in some examples the wireless link condition indication can include one or more of a Quality of Service (QoS) information, a Channel Quality Indicator (CQI) information, a Channel Quality Measurement (CQM) information, a Channel State Information (CSI), a signal strength information, a channel aggregation information, a level of packet failure/re-transmission information, a signal-to-noise (SNR) information, or an interference information. It should be understood that other or additional wireless link conditions may be included in the wireless link condition indication.

Figure 2:
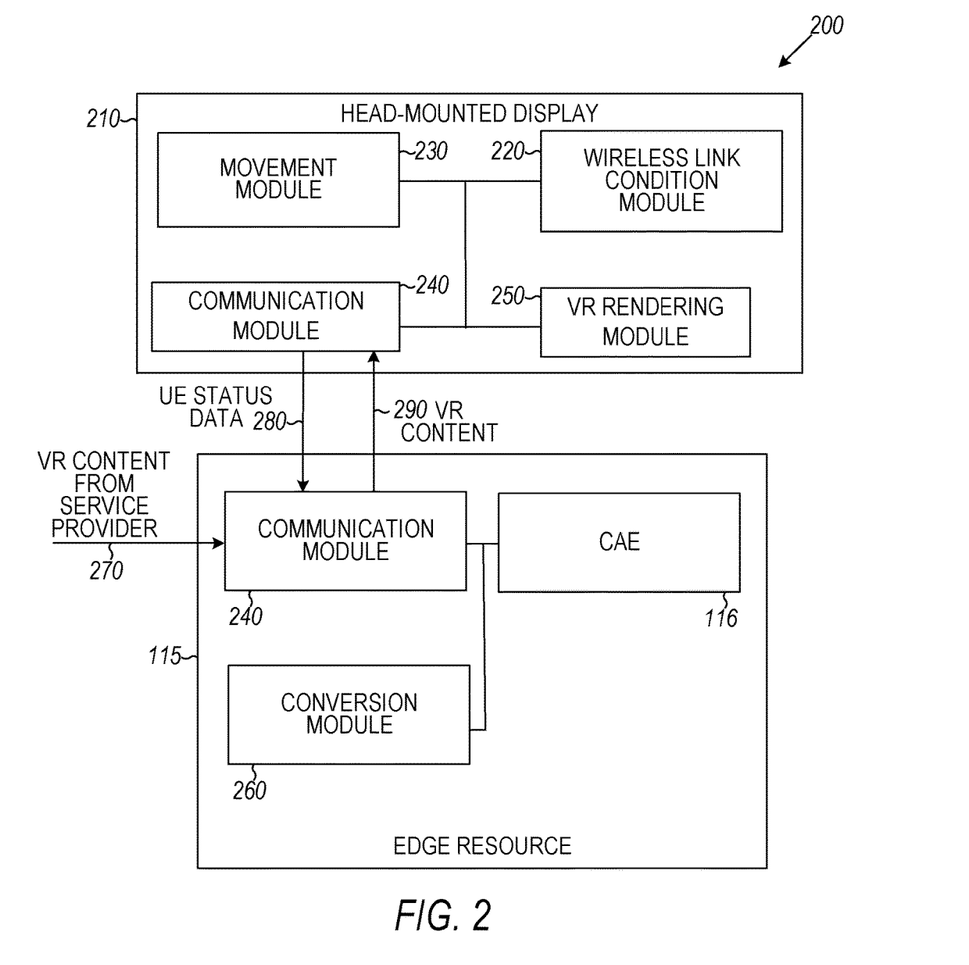
FIG. 2 is a block diagram illustration of modules of a head-mounted display (HMD) and an edge resource according to an example embodiment.

FIG. 2 is a block diagram illustration 200 of modules of a head-mounted display (HMD) 210 and an edge resource 115 according to an example embodiment. The HMD 210 is an example embodiment of a UE 120 and includes a wireless link condition module 220, a movement module 230, a communication module 240, and a VR rendering module 250, configured to communicate with each other (e.g., via a bus, shared memory, or a switch). The edge resource 115 includes a communication module 240, a conversion module 260, and a CAE 116, configured to communicate with each other. Any one or more of the modules described herein may be implemented using hardware (e.g., a processor of a machine, an ASIC, an FPGA, or any suitable combination thereof). Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices. Also shown in FIG. 2 are the data flows 270, 280, and 290.

The communication modules 240 of the HMD 210 and the edge resource 115 are configured to send and receive data. For example, the communication modules 240 may communicate with each other via a mobile network. In some example embodiments, one or both of the communication modules 240 have mobile network connectivity, or are driven by a device such as a smart phone which has mobile network connectivity. As shown in FIG. 2, the communication module 240 of the HMD 210 transmits UE status data in the data flow 280 to the edge resource 115 and receives VR content 295 from the edge resource 115. FIG. 2 further shows that the communication module 240 of the edge resource 115 receives VR content from the VR service provider 132 in the data flow 270, receives the data flow 280 from the HMD 210, and transmits VR content to the HMD 210 in the data flow 290.

The wireless link condition module 220 of the HMD 210 implements wireless link condition functions that measure one or more indicators of wireless link conditions. Example wireless link conditions include received signal strength, packet retransmission statistics, traffic load/congestion, level of packet re-transmission, quality of service (QoS), signal-to-noise ratio, transmit/receive power or signal strength, channel aggregation, and radio energy allocation.

The movement module 230 of the HMD 210 tracks or predicts movement of the HMD 210. Many different movement prediction mechanisms may be used. Such movement prediction mechanisms may be based on simple extrapolation of head movement, such as provided by accelerometers in the HMD 210. Alternatively, movement predictions may be generated using more complex algorithms, based on displayed VR content and based on likely head movements of past or current users when viewing the same or similar content. In one embodiment, yaw (head turning left or right), pitch (looking up and down), and roll (side-to-side tilting of the head) readings are obtained from the HMD 210 (or from separate head tracking sensors). The readings may be used to predict a future head position and to identify VR content corresponding to the predicted future head position. Some prediction approaches may include an average value, a trained linear regression model, or a weighted linear regression applied to the yaw, pitch, and roll readings.

Further prediction approaches may be dependent on the VR content. Such a prediction approach can rely on metadata in the VR content to identify most likely head positions. The likely head positions may be a function of crowd sourced measurements of prior viewers of the VR content, or may be determined by producers of the VR content.

The time when the predicted head position may occur can be determined as a function of the latency between a request for VR content at the predicted head position and the time at which the retrieved VR content can be displayed. A desired latency is less than one second. Latencies greater than one second may result in an unsatisfactory user experience.

The movement module 230 and the wireless link condition module 220 report the UE status data (e.g., data indicating the current or expected head movement and the wireless link condition) to the edge resource 115 in the data flow 280, via the communication modules 240. In some example embodiments, an http communication is used to carry the UE status data to the CAE 116 via the communication modules 240.

The VR rendering module 250 processes the VR content received in the data flow 290 for presentation to a user. For example, the VR content may include a description of three-dimensional objects suitable for processing by a graphics processing unit (GPU) to generate a two-dimensional image that may be displayed on a display device (e.g., an LCD screen) of the HMD 210. As another example, the VR content may include 360 degrees of two-dimensional data and the FOV of the HMD 210 may be 90 degrees. In this example, the VR rendering module 250 would determine the correct portion of the 360 degree video to be displayed on the display device.

The conversion module 260 of the edge resource 115 converts the VR content from the VR service provider 132 received in the data flow 270 from its original form into VR cells. The VR content from the VR service provider 132 may include 360 degree videos, or partial contents that cover multiple UE's FOVs. In some example embodiments, each VR cell corresponds to an FOV and does not overlap with any other VR cells, such that all of the VR cells taken together contain the entire 360 degree video. A VR cell in one embodiment is a VR content transmission that contains a smaller portion of an image, such as VR content that includes only ten degrees of a 360 degree view. Other numbers of cells may be used, such as 120 degree cells, or five degree cells. Note also that the VR cells may be based on spherical coordinates such that each cell may be thought of as an arcuate semi-rectangular surface of a sphere as opposed to an arc segment on a horizon. A number of VR cells, such as four to six or more, may cover an entire field of view for a given head position. In some embodiments, more VR cells adjacent to the VR cells that cover such a field of view may be fetched to allow for errors in head position prediction.

In some example embodiments, the edge resource 115 fetches original content from different cameras mounted on the HMD 210. When the original content from the cameras corresponds to the display area of the HMD 210, there is no need for splitting the 360 degree video into multiple cells with non-overlapping FOVs.

The CAE 116 interacts with the conversion module 260, and provides, to the HMD 210, the VR cells which contain visible contents based on an individual user's FOV. For example, if the VR cells are 10 degree cells and the FOV is 90 degrees, up to ten cells will contain visible content (eight fully-displayed cells and two partial cells). The remaining cells will contain content that is completely outside the user's FOV. Thus, the CAE 116 reduces network traffic by avoiding sending at least a portion of the 360 degree video that will not be seen by the user to the UE 120. If users share a similar FOV, the output of the CAE 116 can be shared, which means adaptation is only done once. As previously discussed, content adaptation is the transforming of content to adapt to device capabilities of the device or devices receiving the content. The CAE 116 may further tailor the VR cells to remove invisible parts (e.g., by cropping the VR cells to the user's FOV). The CAE 116 may also provide resolution adaptation based on wireless link information, effectively reducing video quality for lower quality mobile communication links (e.g., not sending high-resolution video over a mobile communication link with insufficient bandwidth). Finally, the CAE 116 sends the right VR content to the HMD 210, as indicated by the data flow 290, for viewing by the user.

Figure 3:
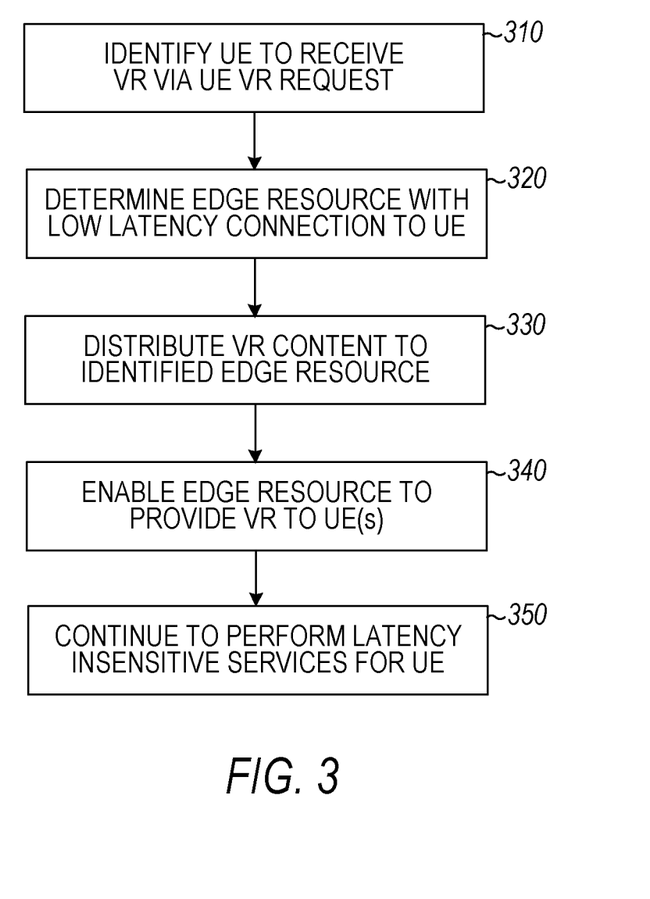
FIG. 3 is a flowchart illustrating a method for distributing VR content from a video server to edge resources of a network for delivery to one or more UEs according to an example embodiment.

FIG. 3 is a flowchart of a method 300 for distributing VR content. The method 300 includes operations 310, 320, 330, 340, and 350. By way of example and not of limitation, the method 300 is described as being performed by the VR service provider 132 of the hierarchical VR services distribution system 100. The VR content may be distributed from the VR service provider 132 (e.g., a video server) to the edge clouds 110 for delivery to one or more UEs 120. A UE 120 may have accessed a video server via the EPC 138 (or other network connection or other network facility) to initiate viewing of the VR content. The UE 120 may select content to view via a VR request. The VR request may be communicated by entry of a command, selection of a link from a web page, or other method.

In operation 310, the VR service provider 132 identifies the UE 120 that requested the VR content. For example, the request from the UE 120 may include an identifier (e.g., an IP address of the UE 120, a user name associated with the UE 120, or any suitable combination thereof).

In operation 320, the VR service provider 132 selects an edge resource 115 with a suitably low latency connection to the UE 120. The edge resource 115 may be selected based on proximity to the mobile infrastructure, such as a base station with cell coverage that includes the UE 120, for example. In one embodiment, latency measurements (or estimates) of the latency of each edge resource 115 with respect to the base station are received from the edge resources 115 and used by the VR service provider 132 to make the determination. The edge resource 115 with the lowest latency and available resources (e.g., network bandwidth, processor cycles, memory, or any suitable combination thereof) may be selected. If the lowest latency edge resource 115 does not have sufficient resources to service the requested VR content, the edge resource 115 with the next lowest latency may be selected. More complex algorithms for identifying and selecting edge resources having sufficient latency may be used.

In further embodiments, different VR content may have different characteristics. For example, some VR content is not interactive and thus may not be sensitive to latency, while other VR content may be quite latency sensitive. The VR content that is latency sensitive may be identified via uniform resource locator (URL) inspection, via maintaining a VR content latency sensitivity table in the VR service provider 132 and using the table via a table lookup to determine whether or not to identify and use an edge resource to service the request, or via any suitable combination thereof. The MME 170 (and/or other core network control components) may be aware of URLs that provide latency sensitive services or such latency information. URLs can be identified from a hypertext transfer protocol (http) request header of the http-based VR request. Based on the URL of a particular request being associated with a latency-sensitive service, the VR service provider 132 may cause the VR content associated with the latency-sensitive service to be provided by an edge resource 115.

In operation 330, the VR service provider 132 distributes VR content to the identified edge resource 115. In one embodiment, the entire VR request is forwarded, and includes an identification of the UE 120 requesting the VR content.

In operation 340, the VR service provider 132 enables the identified edge resource 115 to provide the VR content to the UE 120. The edge resource 115 will then establish a connection, or cause such a connection to be established via the MME 170, to the UE 120 via the RAN 160 to provide the VR content to the UE 120. Since the latency is low, communications between the UE 120 and the edge resource 115 may occur much faster than communications between the UE 120 and the VR service provider 132. For instance, the UE 120 may detect user interaction with the VR content and communicate such interaction to the edge resource 115, enabling the edge resource 115 to quickly react and provide the VR content responsive to such communication.

In one embodiment, the edge resource 115 may convert the VR content into VR cells with multiple fields of view to reduce the amount of VR content provided to the UE 120 via the RAN 160. The VR cells that are provided may correspond to the direction that the user of the UE 120 is looking. The head mounted display worn by the user will provide such direction information to the edge resource 115 via the mobile connection, allowing the edge resource 115 to select the corresponding cells, optionally render the VR content, and provide the VR content to the UE 120 for viewing. Such interactions may not be possible, or may provide a greatly diminished QoE, if attempted to be provided by the VR service provider 132 with larger latency delays.

In operation 350, the UE 120 continues to communicate with the VR service provider 132 via the EPC 138, allowing the VR service provider 132 to perform latency insensitive services for the UE 120, such as selecting different VR content for viewing, billing, managing account information, etc.

Figure 4:
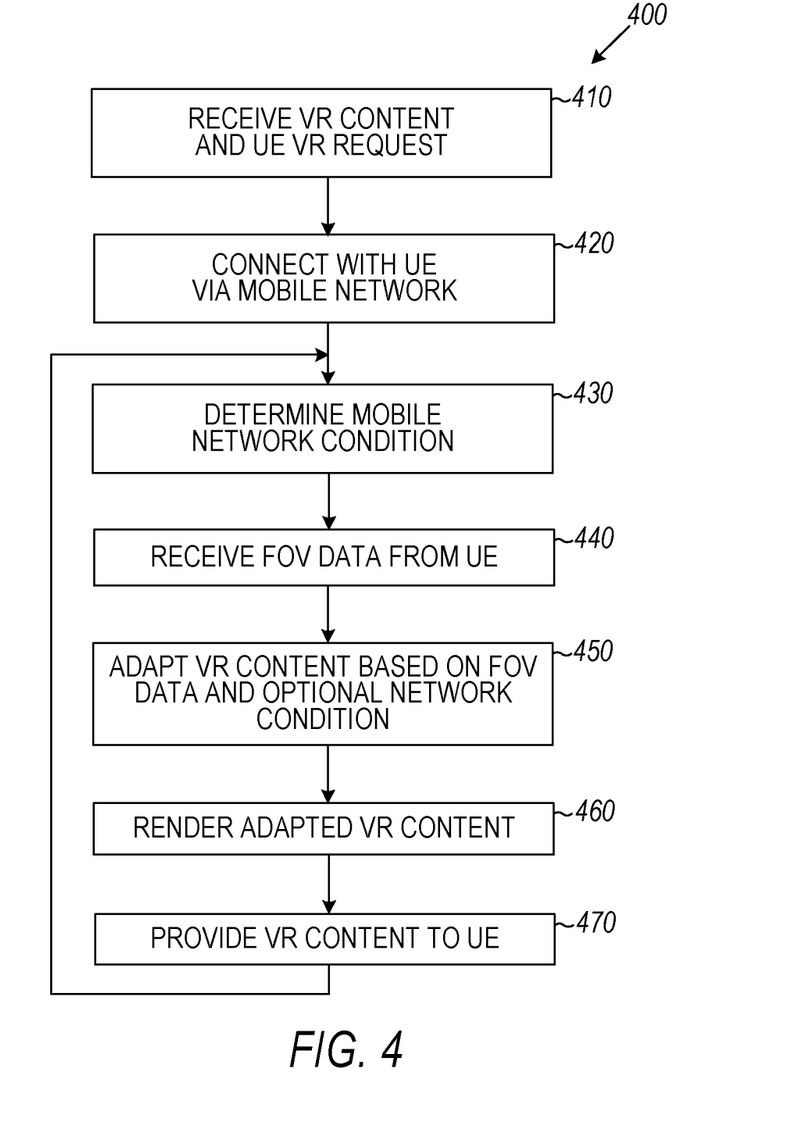
FIG. 4 is a flowchart illustrating a method of adapting VR content via the CAE of the edge resource to provide the VR content to the UE via the mobile network according to an example embodiment.

FIG. 4 is a flowchart of a method 400 of adapting VR content via the CAE of the edge resource to provide the VR content to the UE via the RAN 160. At 410, the VR content and UE VR request is received by the edge resource. The VR content and the VR request may be received simultaneously or at different times. At 420, UE identification information in the UE VR request may be used by the edge resource 115 to connect with the UE via the RAN 160, such as facilitated by the MME. Mobile network communication conditions are then determined, including determination of communication conditions including signal strength, communication protocol/type (such as 2G, 3G, 4G, etc.), or packet transmission failure statistics and packet retransmission rates, for example. The communication conditions may be determined at the UE, at 220, and reported to the CAE as indicated at 240. At 440, FOV data from the UE is received. As previously indicated, the FOV data may be correlated to one or more VR cells of the VR content to allow selection of a portion of an entire 360 degree view to send to the UE. This adaptation of the VR content may be performed by the CAE at 450.

The CAE 116 may also optionally adapt a resolution of the VR content based on the network condition information. If the connection is fast, a high resolution of VR content may be sent to the destination device. However, if the connection is slow, a lower resolution of the VR content may be sent to the destination device. The exact resolutions sent may be varied in different embodiments based on the QoE. In some situations a tradeoff may exist between VR content with too low a resolution versus providing VR content with missing frames and block effects that can also lower the QoE.

At 460, the adapted VR content may be rendered by the edge resource to offload the potentially resource intensive operation from the UE, and at 470 the VR content is provided to the UE via the RAN 160. This rendering may be optional in some embodiments or may be optional in implementation, such as the rendering being performed if the edge resource has available capacity or if the target UE does not have the available capacity, for example.

As the FOV may continue to change over time, method 400 will comprise an iterative and ongoing process, returning to 430 to determine the mobile network condition and receive the FOV data from the UE 120. The VR content being provided to the UE 120 will continue to be adjusted. In some embodiments, the network condition may be monitored continuously, and cause an interrupt to the CAE 116 to determine the proper adaptation of the VR content based on the network condition and on the FOV.

Figure 5:
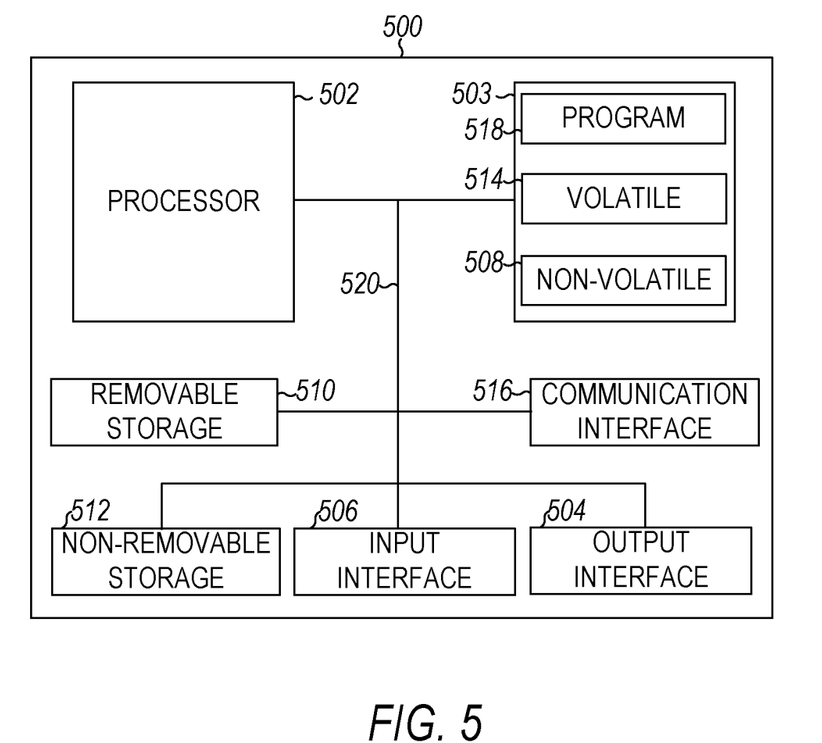
FIG. 5 is a block diagram illustrating circuitry for implementing one or more elements, such as edge resources, video servers, routers, UEs, or other equipment for performing methods according to example embodiments.

FIG. 5 is a block diagram illustrating circuitry for implementing one or more elements, such as edge resources, video servers, routers, UEs, or other equipment for performing methods according to example embodiments. All components need not be used in various embodiments. For example, edge resources may comprise cloud computing resources and have little need for direct user I/O devices. UEs may not include disk drive type storage devices, and other equipment may use different sets of components. One example computing device in the form of a computer 500 may include a processor 502 and a memory 503 in communication with the processor 502 via a bus 520. The memory 503 can comprise one or both of removable storage 510 or non-removable storage 512. Memory 503 may include volatile memory 514 and/or non-volatile memory 508. Although the example computing device is illustrated and described as computer 500, the computing device may be in different forms in different embodiments. For example, the computing device may instead be a smartphone, a tablet, smartwatch, or other computing device including the same or similar elements as illustrated and described with regard to FIG. 5. Devices, such as smartphones, tablets, and smartwatches, are generally collectively referred to as mobile devices or user equipment. Further, although the various data storage elements are illustrated as part of the computer 500, the storage may also or alternatively include cloud-based storage accessible via a network, such as the Internet or server based storage.

Computer 500 may include or have access to a computing environment that includes a variety of computer-readable media, such as volatile memory 514 and/or non-volatile memory 508, removable storage 510 and/or non-removable storage 512 coupled to the bus 520. Computer storage includes random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 500 may include or have access to an input interface 506, an output interface 504, and a communication interface 516 coupled to the bus 520. The output interface 504 may include a display device, such as a touchscreen, that also may serve as an input device. The input interface 506 may include one or more of a touchscreen, touchpad, mouse, keyboard, camera, one or more device-specific buttons, one or more sensors integrated within or coupled via wired or wireless data connections to the computer 500, and other input devices. The computer 500 may operate in a networked environment using the communication interface 516 to connect to one or more remote computers, such as database servers or other devices or systems. The remote computer may include a personal computer (PC), server, router, network PC, a peer device or other common DFD network switch, or the like. The communication interface 516 may communicate over a Local Area Network (LAN), a Wide Area Network (WAN), cellular network, WiFi, Bluetooth, or other networks or systems. According to one embodiment, the various components of computer 500 are connected with a system bus 520.

Computer-readable instructions 518 stored on a computer-readable medium (such as being stored within the memory 503) are executable by the processor 502 of the computer 500. The terms computer-readable medium and storage device do not include carrier waves or signals, to the extent carrier waves and signals are deemed too transitory. Storage can also include networked storage such as a storage area network (SAN).

In an example, the computer 500 includes a memory 503 comprising instructions 518 and one or more processors 502 in communication with the memory 503, wherein the one or more processors 502 execute the instructions 518 to receive virtual reality (VR) content responsive to a VR session request of a user equipment (UE), receive a wireless link condition indication and a field of view (FOV) information from the UE, with the wireless link condition indication corresponding to a wireless link, and adapt the VR content according to the FOV information and the wireless link condition indication. The adapting may be performed to reduce latency of delivery of the adapted VR content to the UE, via a wireless link.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A method comprising:
   an edge resource receiving virtual reality (VR) content responsive to a VR session request of a user equipment (UE);
   the edge resource receiving a wireless link condition indication, a head movement prediction, and a field of view (FOV) information from the UE, with the wireless link condition indication corresponding to a wireless link;
   the edge resource adapting the VR content according to the FOV information, the head movement prediction, and the wireless link condition indication, and
   the edge resource providing the adapted VR content to the UE.

2. The method of claim 1 wherein adapting the VR content comprises:
   dividing the VR content into multiple VR content cells covering multiple portions of the FOV; and
   selecting one or more VR content cells of the multiple VR content cells as the adapted VR content.

3. The method of claim 2 wherein the multiple VR content cells comprise multiple exclusive VR content cells covering multiple exclusive portions of the FOV or multiple non-exclusive VR content cells covering multiple non-exclusive portions of the FOV.

4. The method of claim 2 wherein the FOV information includes a predicted FOV, and with selecting the one or more VR content cells comprising selecting the one or more VR content cells based at least in part on the predicted FOV.

5. The method of claim 1, wherein:
   the FOV information includes a predicted FOV; and
   the adapting of the VR content comprises adapting the VR content further according to the predicted FOV.

6. The method of claim 1 wherein adapting the VR content comprises changing a VR content resolution of the adapted VR content.

7. The method of claim 1 wherein the VR content is adapted if the wireless link condition indication does not exceed a satisfactory wireless link condition threshold.

8. The method of claim 1 wherein the VR content is adapted if the wireless link condition indication does not exceed a satisfactory wireless link condition threshold and the VR content is not adapted if the wireless link condition indication exceeds the satisfactory wireless link condition threshold.

9. An edge resource system comprising:
   a memory storage comprising instructions; and
   one or more processors in communication with the memory, wherein the one or more processors execute the instructions to:
   receive virtual reality (VR) content responsive to a VR session request of a user equipment (UE);
   receive a wireless link condition indication, a head movement prediction, and a field of view (FOV) information from the UE, with the wireless link condition indication corresponding to a wireless link;
   adapt the VR content according to the FOV information, the head movement prediction, and the wireless link condition indication; and
   provide the adapted VR content to the UE.

10. The edge resource system of claim 9 wherein adapting the VR content comprises:
    dividing the VR content into multiple VR content cells covering multiple portions of the FOV; and
    selecting one or more VR content cells of the multiple VR content cells as the adapted VR content.

11. The edge resource system of claim 10 wherein the multiple VR content cells comprise multiple exclusive VR content cells covering multiple exclusive portions of the FOV or multiple non-exclusive VR content cells covering multiple non-exclusive portions of the FOV.

12. The edge resource system of claim 10 wherein the FOV information includes a predicted FOV, and with selecting the one or more VR content cells comprising selecting the one or more VR content cells based at least in part on the predicted FOV.

13. The edge resource system of claim 9, wherein:
    the FOV information includes a predicted FOV; and
    the adapting of the VR content comprises adapting the VR content further according to the predicted FOV.

14. The edge resource system of claim 9 wherein adapting the VR content comprises changing a VR content resolution of the adapted VR content.

15. The edge resource system of claim 9 wherein the VR content is adapted if the wireless link condition indication does not exceed a satisfactory wireless link condition threshold.

16. The edge resource system of claim 9 wherein the VR content is adapted if the wireless link condition indication does not exceed a satisfactory wireless link condition threshold and the VR content is not adapted if the wireless link condition indication exceeds the satisfactory wireless link condition threshold.

17. A non-transitory machine-readable medium that stores instructions which, when executed by one or more processors of an edge resource, cause the edge resource to:
    receive virtual reality (VR) content responsive to a VR session request of a user equipment (UE);
    receive a wireless link condition indication, a head movement prediction, and a field of view (FOV) information from the UE, with the wireless link condition indication corresponding to a wireless link;
    adapt the VR content according to the FOV information, the head movement prediction, and the wireless link condition indication, and
    provide the adapted VR content to the UE.

18. The non-transitory machine-readable medium of claim 17 wherein adapting the VR content comprises:
    dividing the VR content into multiple VR content cells covering multiple portions of the FOV; and
    selecting one or more VR content cells of the multiple VR content cells as the adapted VR content.

19. The non-transitory machine-readable medium of claim 18, wherein the multiple VR content cells comprise multiple exclusive VR content cells covering multiple exclusive portions of the FOV or multiple non-exclusive VR content cells covering multiple non-exclusive portions of the FOV.

20. The non-transitory machine-readable medium of claim 18, wherein the FOV information includes a predicted FOV, and with selecting the one or more VR content cells comprising selecting the one or more VR content cells based at least in part on the predicted FOV.

* * * * *